US005503714A

United States Patent [19]
Reiners et al.

[11] Patent Number: 5,503,714
[45] Date of Patent: Apr. 2, 1996

[54] CHLORINE-FREE MULTIFUNCTIONAL RESINS FOR PAPER FINISHING

[75] Inventors: Jürgen Reiners, Leverkusen; Hans-Josef Laas, Cologne; Joachim König, Odenthal; Helmut Reiff; Joachim Probst, both of Leverkusen; Bruno Bömer, Bergisch Gladbach; Reinhard Halpaap, Odenthal-Gloebusch; Fritz Puchner, Cologne; Harro Träubel, Leverkusen, all of Germany

[73] Assignee: Bayer Aktiengesellschaft, Leverkusen, Germany

[21] Appl. No.: 100,024

[22] Filed: Jul. 30, 1993

[30] Foreign Application Priority Data

Aug. 7, 1992 [DE] Germany ............... 42 26 110.4
Jun. 14, 1993 [DE] Germany ............... 43 19 571.7

[51] Int. Cl.$^6$ ..................................... D21H 21/18
[52] U.S. Cl. ............... 162/164.6; 162/135; 162/164.1; 162/164.3; 427/391
[58] Field of Search ............... 162/164.6, 135, 162/164.3, 158, 164.1; 427/389.9, 391, 394, 395

[56] References Cited

U.S. PATENT DOCUMENTS

| | | | |
|---|---|---|---|
| 3,428,592 | 2/1969 | Youker | 260/29.2 |
| 3,589,978 | 6/1971 | Kamal | 162/158 |
| 3,702,781 | 11/1972 | Dahl | 117/118 |
| 3,989,659 | 11/1976 | Aldrich et al. | 162/164.3 |
| 4,096,127 | 6/1978 | Schurmann et al. | 260/29.2 TN |
| 4,113,506 | 9/1978 | Sackmann et al. | 106/238 |
| 4,376,078 | 3/1983 | Topfl | 260/404.5 |
| 4,505,778 | 3/1985 | Robertson | 162/135 |
| 4,522,686 | 6/1985 | Dumas | 162/158 |
| 4,616,061 | 10/1986 | Henning et al. | 524/591 |
| 4,663,377 | 5/1987 | Hombach et al. | 524/196 |
| 4,670,100 | 6/1987 | Henning et al. | 162/135 |
| 4,786,330 | 11/1988 | Beuzelin et al. | 106/287.25 |
| 4,837,359 | 6/1989 | Woynar et al. | 560/335 |
| 4,857,586 | 8/1989 | Bachem et al. | 524/845 |
| 4,904,750 | 2/1990 | Reiners et al. | 526/301 |
| 4,960,848 | 10/1990 | Scholl et al. | 528/48 |
| 4,994,541 | 2/1991 | Dell et al. | 528/51 |
| 5,076,958 | 12/1991 | Pedain et al. | 252/182.2 |

FOREIGN PATENT DOCUMENTS

| | | |
|---|---|---|
| 17598 | 4/1980 | European Pat. Off. . |
| 13112 | 7/1980 | European Pat. Off. . |
| 74544 | 8/1982 | European Pat. Off. . |
| 207414 | 6/1986 | European Pat. Off. . |
| 2839310 | 3/1980 | Germany . |
| 1487913 | 8/1976 | United Kingdom . |
| 2068034 | 1/1981 | United Kingdom . |

OTHER PUBLICATIONS

Plastics, Metal, Finishing—p. 4. French 29.9.67; Indian 23 & 30.9.67. vol. 7, No. 44, FR.1,496,584 *Dispersible polyurethane mass*.
Chemical Abstracts, vol. 89, 1978, p. 90, 89: 217054t "Treatment of papers and cardboards based on cellulose fiber".
Chemical Abstracts vol. 94, 1991, 94:86035r "Treating paper and cardboard with an aqueous emulsion", Eur. Pat. Appl. 17,598.
43–Wood Products, vol. 93, 1980, p. 91, 93:116260j–Emulsifiable compositions and aqueous emulsions of organic isocyanates, and using them as binders for manufacturing lignocellulose sheets. Eur. Pat. Appl. 13,112.
Chemical Abstracts, vol. 92, 1980, p. 88–92:182828f Sizing agent for Paper., & 92:182829g, Carbamoyl sulfonate sizing agent, Ger. Offen. 2,839,310.
Chemical Abstracts, vol. 84, 1976, p. 540, 84:59587j Oxadiazinones with free isocyanate groups. Ger. 1,670,666.
Textiles, Paper, Cellulose, p. 7, Week A18, 32525A/18 *FR2360–714.
H. Logemann u.a.: Allgemeines zur Polymerisation in heterogener Phase pp. 190–208.

*Primary Examiner*—Peter Chin
*Attorney, Agent, or Firm*—William C. Gerstenzang; Sprung Horn Kramer & Woods

[57] ABSTRACT

The invention relates to a new process for the preparation of cellulose-containing material provided with a dry-strength and wet-strength finish and/or sized, characterized in that the cellulose-containing material is treated with a water-dispersible polyisocyanate mixture (I), which contains tertiary amino and/or ammonium groups, optionally polyether units and optionally hydrophobic groups.

4 Claims, No Drawings

CHLORINE-FREE MULTIFUNCTIONAL RESINS FOR PAPER FINISHING

BACKGROUND OF THE INVENTION

Polyamine-epichlorohydrin resins and polyamide amineepichlorohydrin resins having a reduced organic chlorine content are industrially available, the application or product properties, in particular the effectiveness of the products, being retained virtually in full. Such resins have long been employed for improving the dry and wet strength of paper. Cationic polycondensates containing hydrophobic radicals, for example based on fatty acid-modified polyamines, are also suitable as sizing agents for paper. The organic chlorine content is composed of a certain amount of chlorohydrin functions bonded in the resin, and a chlorine component originating from the low-molecular-weight secondary components chloropropanediol and dichloropropanediol.

When used as a wet-strength agent, an aqueous solution of the polycondensate is added to a pulp suspension, from which the sheet of paper is formed by dewatering. If the resins are adsorbed incompletely onto the cellulose, in the case of a halogen-containing wet-strength agent a certain proportion of organic halogen compounds pass into the effluent from the papermaking, and can be detected there as the so-called AOX value (AOX=adsorbable organic halogen) (DIN 38 409 H14). For environmental protection reasons, introduction of AOX into the waste-water from paper-mills should be avoided or at least kept as low as possible.

Although the content of the secondary component in many products is already well below 0.1%, it is desired to employ chlorine-free products.

Halogen-free papers cannot be produced using the above-mentioned auxiliaries. The term "halogen-free" here should be used in the strictest sense only for products which really do contain no halogen.

Methods are furthermore already known from the prior art for chlorine-free provision of a wet-strength finish, isocyanates being employed as the raw materials. The following procedures are possible here: 1. treatment of paper with masked polyisocyanates, 2. use of reactive mixtures which react in the substrate to give polyurethane, 3. treatment of paper with free polyisocyanates in organic solvents.

However, the known wet-strength agents are not satisfactory in all requirements.

DE-A 3 102 038 describes basic polyurethanes which contain isocyanates which are blocked via oxime groups and are split off during reaction with the cellulose. The disadvantage of this method is that organic radicals, which are not substantive with respect to cellulose, may enter the circulating water of the paper machinery.

A two-component system for coating paper, comprising a polyfunctional isocyanate and a compound which is reactive to isocyanates and contains active hydrogen, is proposed in FR-A 2 360 714. At the end, the finished paper contains 0.5 to 35% by weight of reacted polyurethane.

EP-A 0 017 598 describes aqueous dispersions of polyurethanes, the isocyanate groups of which are blocked. After application to the substrate, the isocyanate groups must be demasked by addition of a metal catalyst or a salt of a tertiary amine. The isocyanate groups thereby released react with the cellulose during the heat treatment.

U.S. Pat. No. 3 702 781 describes polyurethanes having reactive NCO groups, which are applied to paper in organic solvents.

In the process according to DE-A 3 102 038, the isocyanate group must be produced in situ by deblocking protective groups. A disadvantage here is that the protective groups have no affinity for the fibre and therefore can be introduced into the water circulation of the paper machinery. Moreover, higher temperatures (>130° C.) than those which the paper reaches while passing through the drying part of the paper machinery are required for the deblocking. The contact times in the drying part (<60 seconds) as a rule are not sufficient to achieve quantitative deblocking. In the case of U.S. Pat. No. 3 702 781, in which free isocyanates are used, it is necessary because of the high viscosity to use organic solvents, which have to be disposed of by the paper producer and therefore should be avoided as far as possible.

Water-dispersible polyisocyanate formulations which contain free NCO groups and are suitable as an additive for aqueous adhesives are known from EP-A 0 206 059.

DE-A2 557 409 discloses resin acid isocyanates which can be dispersed in water in the presence of nonionic and anionic emulsifiers.

The dispersions or emulsions of carbamoyl sulphonates made from isocyanates and alkali metal and ammonium bisulphites and proposed in DE-A2 839 310can be employed as sizing agents.

U.S. Pat. No. 4,505,778 discloses bulk and surface sizing agents which comprise mixtures of aromatic polyisocyanates containing 1–10% by weight of an isocyanate prepolymer obtained, for example, by reacting aromatic polyisocyanates with monofunctional polyethers.

Furthermore, various polyurethane or polyurea dispersions are known which can be employed as sizing agents. However, these usually anionic products (cf. German Offenlegungsschrift 2 457 972) do not contain any reactive groups in the form of isocyanate groups. Examples of such products are given in the following documents: FR-A1 496 584, U.S. Pat. No. 3,989,659, DE-A2 537 653, EP-A0 037 379, DE-A3 438 563 and EP-A0 207 414.

Latices based on diurethanes have also been proposed as sizing agents (Of. EP-A0 232 196).

However, these products are not satisfactory in all respects. In particular, the stability or dispersibility in water is often poor or cationic additives are necessary to improve the inherent retention of the resin. EP-A0 074 544 describes dispersions which contain a disperse phase of 1. reinforced resin size and 2. hydrophobic ketene dimer or hydrophobic isocyanates having at least 12 carbon atoms, where a cationic dispersant (inter alia a polyamide amine-epichlorohydrin resin) is employed to improve the properties.

In addition, it would be advantageous for the user to have an auxiliary which provides the paper with wet and dry strength and simultaneously also with partial hydrophobicity, i.e. is suitable as a bulk or surface sizing agent.

There was therefore the object of providing a new process for providing cellulose-containing material with a wet- and dry-strength finish and/or sizing by means of a chlorine-free product which is based on unblocked polyisocyanates, can be emulsified in water without addition of emulsifiers and achieves the wet-strength action of the polyamidoamine/ epichlorohydrin resins when used in a wide pH range in pulp and on the surface.

It has now been found, surprisingly, that water-dispersible polyisocyanate mixtures which contain tertiary amino groups, which can also be in the form of their salts, i.e. in protonated or quaternised form, and optionally contain hydrophobic groups and optionally polyether units, are highly suitable dry- and wet-strength agents for cellulose-containing material and in addition are also suitable as sizing agents i.e. for partial hydrophobisation of cellulose-containing material, it being possible for them to be used before sheet formation (use in the pulp), that is to say as an additive to the fibre suspension, or on the surface, that is to say as an application to a sheet of paper which has already been formed.

SUMMARY OF THE INVENTION

The present invention relates to a process for the preparation of cellulose-containing material provided with a dry-strength and wet-strength finish and/or sized, characterised in that the cellulose-containing material is treated with a water-dispersible polyisocyanate mixture (I), which contains tertiary amino and/or ammonium groups.

The polyisocyanate mixtures (I) to be employed according to the invention optionally contain polyether units and/or hydrophobic groups and/or unmodified polyisocyanates.

DESCRIPTION OF PREFERRED EMBODIMENT

In a preferred embodiment of the process according to the invention, the cellulose-containing material is treated with a water-dispersible polyisocyanate mixture (I) which contains tertiary amino and/or ammonium groups, optionally polyether units and/or optionally hydrophobic groups.

In a likewise preferred embodiment of the process according to the invention, the cellulose-containing material is treated with a water-dispersible polyisocyanate mixture (I) which contains tertiary amino and/or ammonium groups and polyether units.

For the purposes of the invention, suitable water-dispersible polyisocyanate mixtures (I) are:
(Ia) Polyisocyanate mixtures comprising
  1) polyisocyanates containing tertiary amino and/or ammonium groups, and
  2) unmodified polyisocyanates E),
(Ib) Polyisocyanate mixtures comprising
  1) polyisocyanates containing tertiary amino and/or ammonium groups,
  2) unmodified polyisocyanates E),
  3) polyisocyanates containing tertiary amino and/or ammonium groups and polyether groups, and
  4) polyisocyanates containing polyether groups,
(Ic) Polyisocyanate mixtures comprising
  1) polyisocyanates containing tertiary amino and/or ammonium groups,
  2) unmodified polyisocyanates E),
  5) polyisocyanates containing tertiary amino and/or ammonium groups and hydrophobic groups, and
  6) polyisocyanates containing hydrophobic groups,
(Id) Polyisocyanate mixtures comprising
  1) polyisocyanates containing tertiary amino and/or ammonium groups,
  2) unmodified polyisocyanates E),
  3polyisocyanates containing tertiary amino and/or ammonium groups and polyether groups,
  4) polyisocyanates containing polyether groups,
  5) polyisocyanates containing tertiary amino and/or ammonium groups and hydrophobic groups, and
  6) polyisocyanates containing hydrophobic groups,
  7) polyisocyanates containing tertiary amino and/or ammonium groups, hydrophobic groups and polyether groups, and
  8) polyisocyanates containing polyether groups and hydrophobic groups,
or mixtures of the polyisocyanate mixtures (Ia) to (Id).

The polyisocyanate mixtures (Ia) and (Id) are particularly preferred for sizing and wet- and dry-strength finishing of cellulose-containing material. The polyisocyanate mixtures (Ib) are particularly suitable for the wet- and dry-strength finishing of cellulose-containing material. The polyisocyanate mixtures (Ic) are particularly suitable for the sizing of cellulose-containing material.

For the purposes of this invention, unmodified polyisocyanates E) are taken to mean polyisocyanates which contain exclusively isocyanate groups.

For carrying out the process according to the invention, preference is given to water-dispersible polyisocyanate mixtures (I) with α) a content of isocyanate groups of 10 to 700 milliequivalents per 100 g of mixture, β) mean NCO functionality of <1.0, γ) a content of ethylene oxide units of from 0 to 30% by weight, based on the mixture, with the polyethylene oxide chain as a mean molecular weight (number average) of from 100 to 3500, preferably from 100 to 1000, particularly preferably from 100 to 600 g/mol, δ) a content of tertiary amino groups or ammonium groups of from 50 to 5000 milliequivalents per 100 g of mixture, and ε) a content of hydrophobic radicals of 0–250 milliequivalents equivalents per 100 g of mixture.

Particular preference is given in the process according to the invention to water-dispersible polyisocyanate mixtures (I) with α) a content of isocyanate groups of 10 to 300 milliequivalents per 100 g of mixture, β) an average NCO functionality of 1.0 to 5, γ) a content of ethylene oxide units of 0–20% by weight, based on the mixture, the polyethylene oxide chain as an average molecular weight (number average) of 100 to 3500, preferably 100 to 1000, particularly preferably 100 to 600 g/mol, δ) a content of tertiary amino groups or ammonium groups of 50 to 3500 milliequivalents per 100 g of mixture, and ε) a content of hydrophobic radicals of 0–100 milliequivalents per 100 g of mixture.

In a further preferred embodiment, the process according to the invention is carried out using water-dispersible polyisocyanate mixtures with α) content of isocyanate groups of 47 to 595 milliequivalents, preferably 238 to 476 milliequivalents, based on 100 g of mixture, β) an average NCO functionality of 1.5 to 4.2 preferably 2.0 to 4.2, γ) a content of ethylene oxide units of 7 to 30% by weight preferably 7 to 20% by weight, based on the mixture, wherein the polyethylene oxide chain has an average molecular weight (number-average) of 100 to 3500, preferably 100 to 1000, particularly preferably 100 to 600 g/mol, and δ) a content of tertiary amino groups or ammonium groups of 1 to 500 milliequivalents preferably 5 to 300 milliequivalents, per 100 g of mixture, The values stated for the NCO functionality of the water-dispersible polyisocyanates to be employed in the process according to the invention relate to the value which can be calculated from the nature and functionality of the starting components in accordance with the formula $$f = \frac{\Sigma \text{ equivalents NCO} - \Sigma \text{ equivalents OH}}{\Sigma \text{ mol (NCO + OH)} - \Sigma \text{ equivalents OH}}$$

The content of isocyanate groups is in each case calculated as NCO with a molecular weight of 42 g/mol. The water-dispersible polyisocyanate mixtures (I) employed for carrying out the process according to the invention are obtainable by reaction, in any desired sequence, of II) (cyclo)aliphatic amines which optionally contain ether, ester or amide groups, contain at least one group which is reactive towards isocyanates and contain at least one tertiary amino group and/or ammonium group, or mixtures thereof, with III) unmodified polyisocyanates E), and optionally with IV) $C_4$–$C_{30}$-hydrocarbons G) which are straight-chain or branched, saturated or mono- or polyunsaturated, and contain at least one group which is reactive towards isocyanates, and optionally with v) polyalkylene oxide polyether-alcohols F) which optionally contain ester groups, the ratio of equivalents of NCO groups of component III) employed to the sum of the groups of components II), IV) and V) which are reactive towards isocyanates being at least 0.1:1 to about 1000:1, preferably 4:1 to about 1000:1.

The water-dispersible polyisocyanate mixtures (I) employed for carrying out a further embodiment of the process according to the invention are obtainable by reacting, in any desired sequence, II) (cyclo)aliphatic amines which optionally contain ether, ester or amide groups, contain at least one group which is reactive towards isocyanates and contain at least one tertiary amino group and/or ammonium group, or mixtures thereof, with III) unmodified polyisocyanates E), and with V) polyalkylene oxide polyether-alcohols F) which optionally contain ester groups, the ratio of equivalents of NCO groups of component III) employed to the sum of the groups of components II) and V) which are reactive towards isocyanates being at least 2:1, preferably 4:1 to about 1000:1.

The water-dispersible polyisocyanates (I) employed for carrying out the process according to the invention are preferably obtainable by reaction of II) A) Amines which contain a group which is reactive towards isocyanates, of the formula

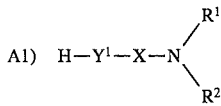

in which

Y¹ represents —O—, —NH— or —NR³—, wherein R³ represents methyl or ethyl,

R¹ and R² a) independently of one another represent $C_1$–$C_4$-alkyl or $C_3$–$C_6$-cycloalkyl, b) represent a radical of the formula

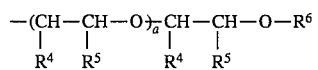

wherein $R^4$ and $R^5$ independently of one another represent hydrogen or methyl, with the condition that always one of the radicals represents hydrogen, $R^6$ represents methyl or ethyl and a assumes values from 0 to 10, or c) represent a $C_2$–$C_4$-alkyl radical, substituted by one or more tertiary amino groups and/or ammonium groups, of the formulae

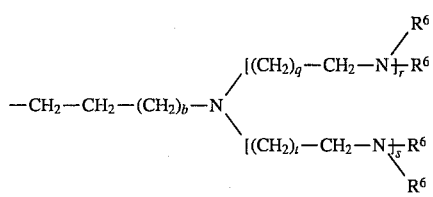

or

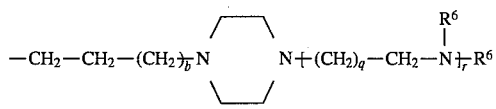

wherein b assumes values from 0 to 2, q and t independently of one another assume values of 1 or 2, r and s independently of one another assume values from 0 to 3 and $R^6$ has the abovementioned meaning, or d) together with the N atom to which they are bonded form a 5- or 6-membered ring of the formula

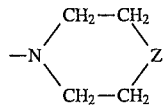

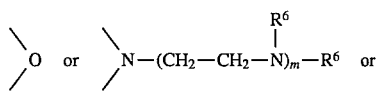

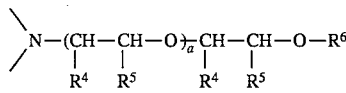

wherein m assumes values from 0 to 2 and a, $R^4$, $R^5$ and $R^6$ have the abovementioned meaning, and X represents $C_2$- to $C_{10}$-alkylene, $C_5$- to $C_{10}$-cycloalkylene, a radical of the formula

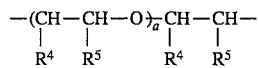

wherein $R^4$, $R^5$ and a have the abovementioned meaning, or a radical of the formula

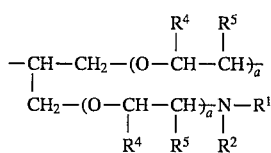

in which a, $R^4$, $R^5$, $R^1$ and $R^2$ have the abovementioned meaning, or

A.2) of the formula

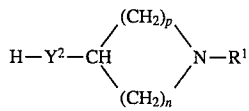

wherein $Y^2$ represents —O—, —NH— or $NR^3$—, wherein $R^3$ has the abovementioned meaning, n and p independently of one another assume values of 1 or 2 and $R^1$ has the abovementioned meaning, or

A 3) of the formula

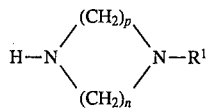

wherein n, p and $R^1$ have the abovementioned meaning, or

A 4) of the formula

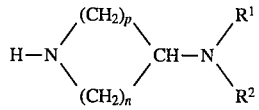

wherein n, p, $R^1$ and $R^2$ have the abovementioned meaning, or

B) amines which contain more than one group which is reactive towards isocyanates and optionally ether and/or ester and/or amide groups and have a molecular weight of less than 10 000 g/mol, or c) the compounds which are reactive towards isocyanates and contain ammonium groups obtained by reaction of A) or B) by protonation and/or quaternisation, or any desired mixtures of A) to C), with III) a mixture of one or more unmodified polyisocyanate E) having an average NCO functionality of 2.0 to 8.0, preferably 2.0 to 6.0, particularly preferably 2.1 to 4.4 and in particular 2.3 to 4.3, and a content of isocyanate groups of 10 to 50% by weight, preferably 19 to 24% by weight, based on the mixture III, optionally with IV) $C_4$–$C_{30}$-hydrocarbons G) which are straight-chain or branched, saturated or mono- or polyunsaturated, and contain at least one group which is reactive towards isocyanates, and optionally with v) mono- or polyvalent polyalkylene oxide polyetheralcohols F) which contain a statistical average of 5.0 to 70 ethylene oxide units and optionally contain ester groups, in any desired sequence.

Water-dispersible polyisocyanate mixtures (I) with

α) a content of isocyanate groups of 10 to 700, preferably 10 to 300 milliequivalents, per 100 g of mixture, β) an average NCO functionality of ≧1.0, preferably 1.0 to 5, γ) a content of ethylene oxide units of 0 to 30% by weight, preferably 0 to 20% by weight based on the mixture, wherein the polyethylene oxide chain has an average molecular weight (number-average) of 100 to 3500, preferably 100 to 1000, particularly preferably 100 to 600 g/mol, δ) a content of tertiary amino groups or ammonium groups of 50 to 5000, preferably 50 to 3500 milliequivalents per 100 g of mixture and ε) a content of hydrophobic radicals of 1 to 250 milliequivalents per 100 g of mixture are new and the invention likewise relates to them.

Water-dispersible polyisocyanate mixtures with

α) a content of isocyanate groups 2 to 25% by weight, preferably 10 to 20% by weight, based on the mixture, β) an average NCO functionality of 1.5 to 4.2, preferably 2.0 to 4.2, γ) a content of ethylene oxide units of >10 to 30% by weight, based on the mixture, wherein the polyethylene oxide chain has an average molecular weight (number average) of 100 to 3500, preferably 100 to 1000, particularly preferably 100 to 600 g/mol, and δ) a content of tertiary amino groups or ammonium groups of 1 to 500, preferably 5 to 300 milliequivalents per 100 g of mixture are new and the invention likewise relates to them.

The invention also relates to the corresponding water-dispersible polyisocyanates obtainable by protonation and/or quaternisation of the abovementioned polyisocyanate mixtures according to the invention which contain tertiary amino groups, alkylating agents, such as, for example, dimethyl sulphate, diethyl sulphate or $C_1$- to $C_4$-alkyl halides and -sulphonates, being used for the alkylation.

The invention also relates to the aqueous dispersions of the polyisocyanates according to the invention and the hydrolysis products, which are contained therein, where appropriate, and contain urea groups, of the water-dispersible polyisocyanates (I) according to the invention containing tertiary amino groups or ammonium groups.

The term "water-dispersible" in connection with the polyisocyanate mixtures (I) means that the mixtures in a concentration of up to 70% by weight, preferably up to 50% by weight, give finely divided dispersions in water with particle sizes (ultracentrifuge) of <500 nm. For the purpose of the present invention, "hydrophobic groups" is taken to mean groups which are derived from $C_4$–$C_{30}$-hydrocarbons G) which are straight-chain or branched, saturated or mono- or polyolefinically unsaturated and contain at least one group which is reactive towards isocyanates.

The corresponding water-dispersible polyisocyanate mixtures containing ammonium groups obtainable by protonation and/or quaternisation of the water-dispersible polyisocyanate mixtures (I) to be employed according to the invention are also suitable for carrying out the process according to the invention. Alkylating agents, such as, for example, dimethyl sulphate, diethyl sulphate or $C_1$–$C_4$-alkyl halides and -sulphonates, can be used for the quaternisation.

Examples of amines II) A) which may be mentioned are: N,N-dimethylethylenediamine, N,N-dimethylpropylenediamine, dimethylaminohydroxyethane, dimethylaminohydroxypropane, diethylaminohydroxyethane, dibutylaminohydroxyethane, diethylaminoethoxyhydroxyethane, (2-diethylaminoethoxy)ethoxyhydroxyethane, N,N'-triethyl-N'-[ω-hydroxytetraethoxyethyl]propylenediamine, N-hydroxyethyl-morpholine, N-hydroxyethyl-methylpiperazine, N-hydroxyethylpiperidine, N-hydroxyethylpyrrolidine, 4-hydroxy-N-methylpiperidine, 4-hydroxy-1-dimethylaminocyclohexane, 1,3-bis(dimethylamino-ethoxyethoxy)-2-hydroxypropane, 1,3-bis(dimethylaminopropoxy)-2-hydroxypropane and the amines of the following formulae:

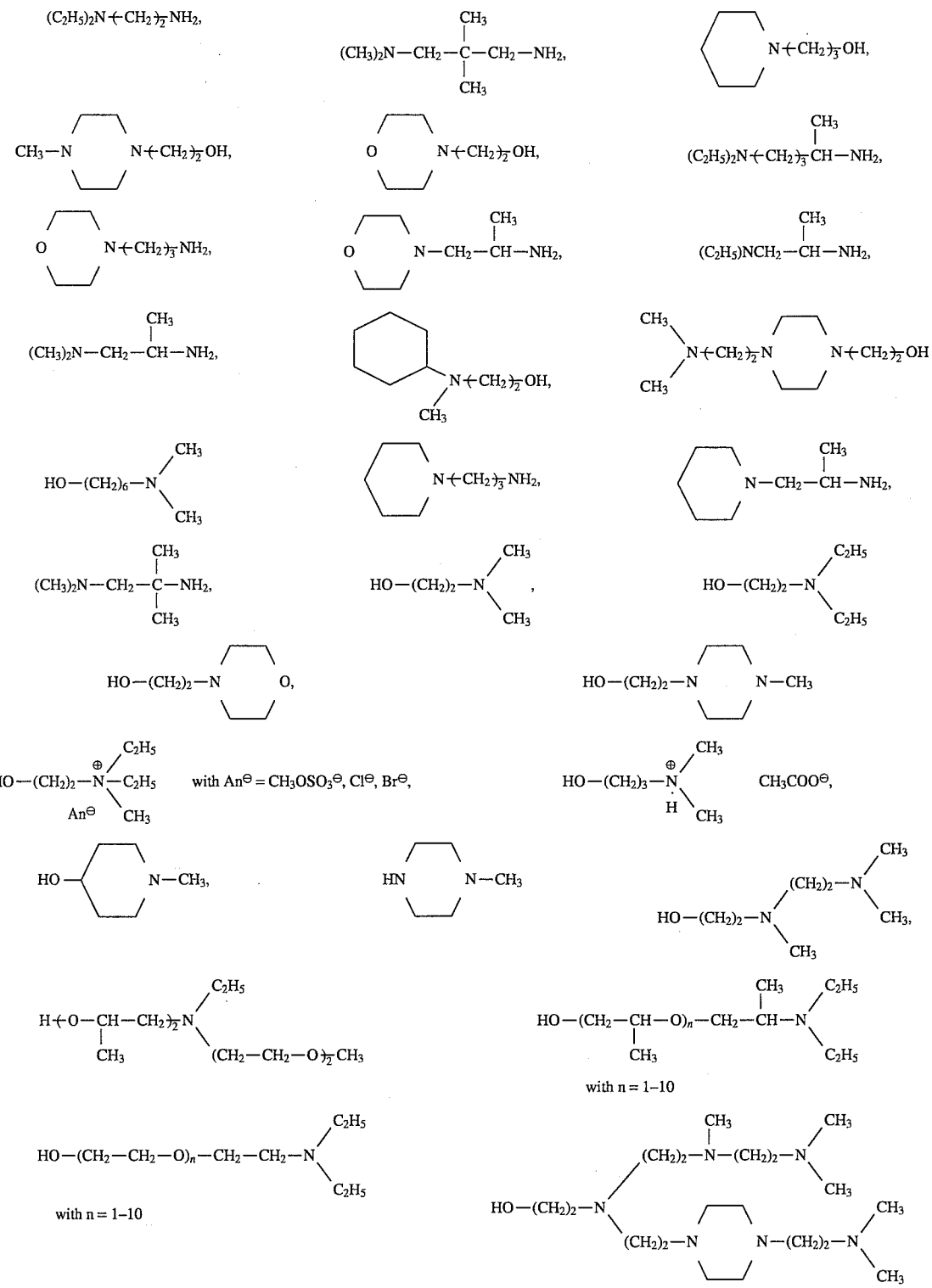

-continued

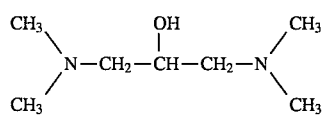 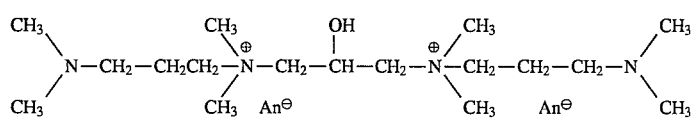

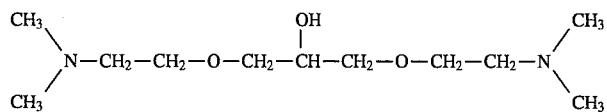

with $An^{\ominus} = Cl^{\ominus}, Br^{\ominus}, CH_3OSO_3^{\ominus}$

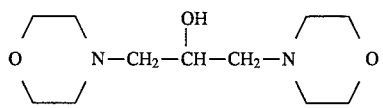 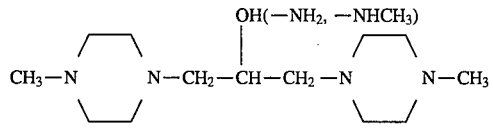

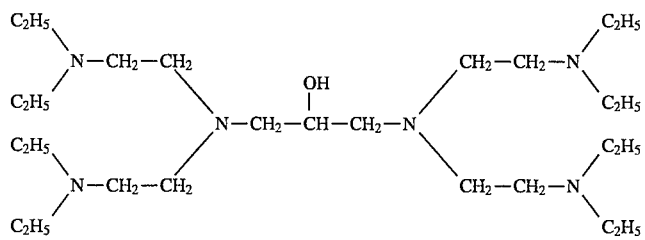

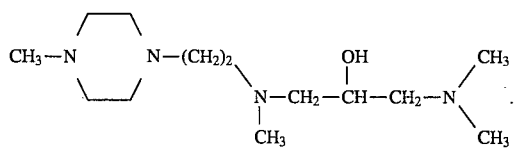

Examples of amino-alcohols B) which may be mentioned are: methyl-bis(2-hydroxyethyl)-amine, methyl-bis(2-hydroxypropyl)amine, N,N'-bis(2-hydroxyethyl)-N,N'-dimethylethylenediamine, N,N''-bis(2-hydroxyethoxyethyl)-N, N',N''' -trimethyl-diethylenetriamine, N,N-dimethylaminopropylbis[ω-hydroxy-tetraethoxyethyl]amine, triethanolamine, reaction products of triethanolamine with 3 to 20 mol of ethylene oxide and/or propylene oxide per mol of amine, reaction products of polyamines, such as aminoethylpiperazine, triethylenetetramine and bis-(2-aminoethyl)piperazine, with ethylene oxide and/or propylene oxide, diethylenetriamine-bispropionamide, N,N' -bis-propionylaminoethyl-N'''(2-hydroxyethyl)amine and reaction products of tetramethylethylenediamine/dichloroethane condensates with ethylene oxide and/or propylene oxide.

The following polycondensates, for example, are also suitable amines II) B):

a) polyesters containing hydroxyl end groups, prepared by condensation of $C_2$- to $C_8$-dicarboxylic acids, polyethylene oxide and/or polypropylene oxide or copolyethers of ethylene oxide and propylene oxide, and dihydroxyalkylamines, preferably N-methyl-diethanolamine or N-methyl-diisopropanolamine, having an OH functionality of 2, b) polyesters containing hydroxyl end groups, prepared by condensation of $C_2$- to $C_8$-dicarboxylic acids and the dihydroxyalkylamines listed under a), having an OH functionality of 2, c) polyester-amides containing hydroxyl end groups or amino end groups, from $C_2$- to $C_8$-dicarboxylic acids, $C_2$- to $C_6$-diaminoalkanes, preferably ethylenediamine, and the dihydroxyalkylamines listed under a), having an OH functionality of 2, d) polyesters, which contain hydroxyl end groups, from $C_2$- to $C_8$-dicarboxylic acids, trishydroxyalkanes, preferably trimethylolpropane and reaction products thereof with 1 to 10 mol of ethylene oxide or propylene oxide, and the dihydroxyalkylamines listed under a), having a functionality of more than 2, e) polyamines containing hydroxyl functional groups, which are obtainable by reaction of ammonium or linear or branched (poly)alkylenepolyamines, such as, for example, ethylenediamine, diethylenetriamine, triethylenetetramine or bis(3-aminopropyl)methyl-amine, α, ω-polyether-diamines having a primary or secondary amino group or condensates thereof with less than the equivalent amount of dihalogenoalkanes, such as dichloroethane, with alkylene oxides, preferably triethanolamine, tris(2-hydroxypropyl)amine, tetrakis(2-hydroxypropyl)ethylenediamine, f) polyamidoamines which contain hydroxyl functional groups and are obtainable by reaction of linear or branched polycondensates of $C_2$- to $C_8$-dicarboxylic acids, diamines and polyamines which contain at least three acylatable amino groups, such as diethylenetriamine or triethylenetetramine, and/or polyamines having at least two acylatable amino groups and other tertiary amino groups, such as bis(3-aminopropyl)-methylamine, and optionally caprolactam or optionally polyether-diols or polyetherdiamines, with alkylene oxides, 1–3 mol of alkylene oxide being employed per primary and secondary amino group in the polycondensate, g) polyamidoamines according to f) containing hydroxyl functional groups, which contain hydroxyethyl end groups, in the place of the reaction with alkylene oxides, and are obtainable by cocondensation with ethanolamine, h) amino-alcohols of the formula

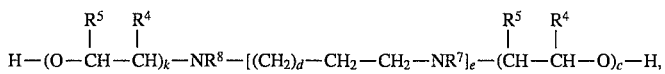

wherein $R^4$ and $R^5$ represent hydrogen or methyl, with the condition that always one radical represents hydrogen, $R^8$ and $R^7$ independently of one another represent methyl, ethyl or a radical of the formula

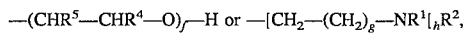

wherein $R^1$ and $R^2$ have the abovementioned meaning and g assumes values from 1 to 6, h represents zero to 4 and $R^4$ and $R^5$ have the abovementioned meaning, k, c and f assume values from 0 to 20, e assumes values from 0 to 3 and d assumes values of 0 or 1.

The amines II) B) in general preferably have an average molecular weight of less than 10 000 g/mol. Those having an average molecular weight of less than 5 000 g/mol, in particular less than 3 000 g/mol, are particularly preferred.

Suitable amines II) C) are, for example, the amines which are obtainable by reaction of acids or alkylating agents with components II) A) or II) B) and in which all or some of the tertiary amino groups have been converted into ammonium groups.

Acids which are suitable for this reaction are, preferably, acetic acid, formic acid and HCl, and possible alkylating agents are, for example, $C_1$–$C_4$-alkyl chlorides and bromides and dialkyl sulphates, such as dimethyl sulphate or diethyl sulphate.

The polyisocyanates E), which were mentioned in III) and are not modified, are any desired polyisocyanates which are prepared by modification of simple, preferably (cyclo)aliphatic diisocyanates and have a uretdione and/or isocyanurate, urethane and/or allophanate, biuret or oxadiazine structure, such as are described, for example, in German Offenlegungsschriften 1 670 666, 3 700 209 and 3 900 053 or EP-A 0 336 205 and 0 339 396 by way of example. Suitable polyisocyanates-E) are also polyisocyanates containing ester groups, for example the tetrakis- and tris-isocyanates accessible by reaction of pentaerythritol silyl ethers or trimethylolpropane silyl ethers with isocyanatocaproyl chloride (compare DE-A 3 743 782). It is furthermore also possible to use triisocyanates such as, for example, tris-isocyanatodicyclohexylmethane.

Suitable diisocyanates for the preparation of the unmodified polyisocyanates E) are in principle those having a molecular weight range from 140 to 400 and (cyclo)aliphatically bonded isocyanate groups, such as, for example, 1,4-diisocyanatobutane, 1,6-diisocyanatohexane, 1,5-diisocyanato-2,2-dimethylpentane, 2,2,4- or 2,4,4 -trimethyl-1,6-diisocyanatohexane, 1,3- and 1,4-diisocyanatocyclohexane, 1-isocyanato-3,3,5-trimethyl-5 -isocyanatomethyl-cyclohexane, 1-isocyanato-1-methyl-4 -isocyanatomethyl-cyclohexane and 4,4'-diisocyanatodicyclohexyl-methane, cyclohexyl-methane, or any desired mixtures of such diisocyanates.

The unmodified polyisocyanates E) are preferably polyisocyanate mixtures which have an NCO content of 19 to 24% by weight, essentially comprise trimeric 1,6-diisocyanatohexane or 1-isocyanato-3,3,5-trimethyl-5-isocyanatomethyl-cyclohexane and optionally dimeric 1,6-diisocyanatohexane or 1-isocyanato-3,3,5-trimethyl-5-isocyanatomethyl-cyclohexane and the corresponding higher homologues and contain isocyanurate groups and optionally uretdione groups. The corresponding polyisocyanates which have the NCO content mentioned, are largely free from uretdione groups and contain isocyanurate groups, such as are obtained by catalytic trimerisation, which is known per se, of 1,6-diisocyanatohexane or 1-isocyanato-3,3,5 -trimethyl-5-isocyanatomethyl-cyclohexane with isocyanurate formation, and which preferably have an (average) NCO functionality of 3.2 to 4.2, are particularly preferred as component E). Preferred components E) are also the trimeric polyisocyanates which have an NCO content of 19 to 24% by weight, are obtained by reaction of 1,6-diisocyanatohexane with a substoichiometric amount of water in a known manner and essentially contain biuret groups.

Other suitable, although not preferred, polyisocyanates E) are aliphatic or aromatic diisocyanates, such as hexamethylene diisocyanate, toluylene diisocyanate, 1,5-diisocyanatonaphthalene, diphenylmethane diisocyanate and higher homologues thereof with uretdione, isocyanurate, allophanate or biuret groups and the like.

Hydrocarbons G) are those having 4 to 30 carbon atoms which are straight-chain or branched saturated or mono- or polyunsaturated and containing at least one group which is reactive towards isocyanates. Reactive groups are taken to mean amino, hydroxyl and carboxyl groups. Examples which may be mentioned are the following hydrocarbons G): stearyl alcohol, stearylamine, stearic acid, dodecanol, hexanol, undecanol, 2-ethylhexanol, hexadecylamine, hexadecanol, dehydroabietyl alcohol, behenyl alcohol, behenic acid, oleic acid, linoleic acid, oleyl alcohol, 7 (8)-hydroxytricyclo[5.2.1.0$^{2.6}$]dec-3(4)-ene, hexahydrophthalic acid, 11-hydroxystearic acid and 1-hydroxyundec-10-ene.

The polyalkylene oxide polyether-alcohols F) which were mentioned in V) are mono- or polyvalent polyalkylene oxide polyether-alcohols which contain a statistical average of 5 to 70, preferably 6 to 60 ethylene oxide units per molecule, such as are accessible in a known manner by alkoxylation of suitable starter molecules. Any desired mono- or polyhydric alcohols having a molecular weight range of 32 to 150 g/mol, such as are also used, for example, in accordance with EP-A 0 206 059, can be employed as starter molecules for the preparation of the polyalkylene oxide polyether-alcohols F). Monofunctional aliphatic alcohols having 1 to 4 carbon atoms are preferably used as starter molecules. The use of methanol is particularly preferred.

Alkylene oxides which are suitable for the alkoxylation reaction are, in particular, ethylene oxide and propylene oxide, which can be employed in the alkoxylation reaction in any desired sequence or also as a mixture.

The polyalkylene oxide polyether-alcohols F) are either pure polyethylene oxide polyethers or mixed polyalkylene oxide polyethers which contain at least one polyether sequence which has at least 5, in general 5 to 70, preferably 6 to 60, and particularly preferably 7° to 20° ethylene oxide units, the alkylene oxide units comprising ethylene oxide units to the extent of at least 60 mol %, preferably to the extent of at least 70 mol %.

Preferred polyalkylene oxide polyether-alcohols F) are monofunctional polyalkylene oxide polyethers which have been started on an aliphatic alcohol containing 1 to 4 carbon atoms and which contain a statistical average of 6 to 60 ethylene oxide units. Particularly preferred polyalkylene oxide polyether-alcohols F) are pure polyethylene glycol monomethyl ether-alcohols which contain a statistical average of 7 to 20 ethylene oxide units.

Suitable polyalkylene oxide polyethers F) containing ester groups are polyester-ethers which contain OH end groups, are obtainable by reaction of aliphatic $C_2$- to $C_8$-dicarboxylic acids or esters or acid chlorides thereof with polyethers from the group comprising polyethylene oxides, polypropylene oxides or their mixtures or copolyethers thereof, 0.8 to 0.99 equivalent of carboxyl groups or derivatives thereof being employed per OH equivalent of the polyether, and have an average molecular weight of less than 10 000 g/mol, preferably less than 3 000 g/mol, and contain hydroxyl end groups.

In the case where the amines or amino-alcohols II A) to II C) contain polyether chains, reaction of A) and/or B) and/or C) with the polyisocyanates E) can also lead directly to water-dispersible polyisocyanates, so that, if appropriate, the content of component F) can be reduced.

The polyisocyanate mixtures (I) to be employed according to the invention can also be employed in combination with external ionic or nonionic emulsifiers. Such emulsifiers are described, for example, in Methoden der organischen Chemie (Methods of Organic Chemistry), Houben-Weyl, Volume XIV/1, Part 1, page 190–208, Thieme-Verlag, Stuttgart (1961), or in U.S. Pat. No. 3,428,592 or EP-A 0 013 112. The emulsifiers are employed in an amount which ensures dispersibility.

If polyisocyanates E) are initially reacted with polyalkylene oxide polyether-alcohols F), this reaction can be carried out in a manner which is known per se, observing an NCO/OH equivalent ratio of at least 2:1, in general from 4:1 to about 1 000:1, polyether-modified polyisocyanates D) being obtained with an average NCO functionality of 1.8 to 4.2, preferably 2.0 to 4.0, a content of (cyclo)aliphatically bonded isocyanate groups of 12.0 to 21.5% by weight and a content of ethylene oxide units located within polyether chains (calculated as $C_2H_4O$, molecular weight=44 g/mol) of 2 to 20% by weight, the polyether chains containing a statistical average of 5 to 70 ethylene oxide units.

The reaction of components A) and/or B) and/or C) with components E) and optionally F) and optionally G, is carried out in any desired sequence with exclusion of moisture, preferably without a solvent. As the amount of alcohol component employed increases, a higher viscosity of the end product is achieved, so that in certain cases which are not preferred, (when the viscosity rises, for example, above 100 Pas), a solvent which is preferably water-miscible but inert towards the polyisocyanate can be added. Suitable solvents are: alkyl ether-acetates, glycol diesters, toluene carboxylic acid esters, acetone, methyl ethyl ketone, tetrahydrofuran and dimethylformamide. The reaction can be accelerated by co-using catalysts which are known per se, such as dibutyltin dilaurate, tin(II) octoate or 1,4-diazabicyclo[2,2,2]octane, in amounts of 10 to 1 000 ppm, based on the reaction components.

The reaction is carried out in the temperature range up to 130° C., preferably in the range between 10° C. and 100° C., particularly preferably between 20° C. and 80° C. The reaction is monitored by titration of the NCO content or by measurement of the IR spectra and evaluation of the carbonyl band at about 2 100 cm$^{-1}$, and has ended when the isocyanate content is no more than 0.1% by weight above the value which is achieved with complete conversion at the given stoichiometry. As a rule, reaction times of less than 24 hours are adequate. Solvent-free synthesis of the polyisocyanates to be employed according to the invention is preferred. In an embodiment which is not preferred, it is also possible for the polyisocyanate mixtures to be employed according to the invention to be prepared by mixing 1) unmodified polyisocyanates E), 2) polyisocyanates which are obtained by reaction of polyisocyanates E) with the amines mentioned under I), the ratio of the equivalents of the groups of I) which are reactive towards isocyanates to the NCO groups of component II) employed being 1:1 to 1:1000, and 3) polyisocyanates which are obtained by reaction of polyisocyanates E) with polyalkylene oxide polyether-alcohols F), the ratio of the equivalents of the groups of component III) which are reactive towards isocyanates to the NCO groups of component I) employed being 1:1 to 1:1000.

The number of amine equivalents, the polyether content, the NCO content and the NCO functionality here, can be adjusted by the expert, by appropriate weighing, such that the resulting mixture has the necessary composition for water-dispersibility, the preferred ranges already mentioned applying.

The water-dispersible polyisocyanate mixtures (I) to be employed according to the invention are easy to handle industrially and, with exclusion of moisture, are stable to storage for months. The polyisocyanates which contain hydrophobic groups are each liquid or wax-like depending on the content of the hydrophobic groups.

The water-dispersible polyisocyanate mixtures (I) are preferably employed without organic solvents for carrying out the process according to the invention. They are very easy to emulsify in water, if necessary with addition of acids and/or at temperatures of up to 100° C. The active compound content of the emulsion can be up to 70% by weight. However, it is more advantageous to prepare emulsions having an active compound content of 1 to 50% by weight, which can then be further diluted, if appropriate, before the metering point. The mixing units customary in industry (stirrers, mixers with the rotor-stator principle and, for example, high pressure emulsifying machines) are suitable for the emulsification. The preferred polyisocyanates are self-emulsifying, that is to say they can easily be emulsified after addition to the aqueous phase, even without the action of high shearing forces. A static mixer is in general sufficient. The resulting emulsions have a certain processing time, which depends on the structure of the polyisocyanates to be employed according to the invention, in particular on their content of basic N atoms. The processing time of such an aqueous emulsion is as a rule up to about 24 hours. The processing time is defined as the time within which the optimum dry- and wet-strength action or the sizing action is achieved.

To facilitate incorporation into the aqueous phase, it may be expedient to employ the water-dispersible polyisocyanate mixture to be employed according to the invention as a solution in a solvent which is inert towards isocyanate groups. Example of suitable solvents are ethyl acetate, ethylene glycol diacetate, propylene glycol diacetate, 2-butanone, 1-methoxypropyl 2-acetate, toluene and mixtures thereof. The content of solvent in the solution of the polyisocyanate should be not more than 80% by weight, preferably not more than 50% by weight. However, the use according to the invention of solvent-free water-dispersible polyisocyanate mixtures is particularly preferred.

Cellulose-containing materials which are suitable for the process according to the invention are, for example, paper or paper-like material, such as paperboard or card.

The finishing treatment is carried out in a manner which is known per se.

The polyisocyanate mixtures (I) which are preferred for the wet- and dry-strength finishing have an NCO functionality of greater than 2 and contain only a small amount of, preferably, from 0 to 100 milliequivalents of hydrophobic radicals per 100 g of polyisocyanate mixture (I). The polyisocyanate mixtures (I) which are preferred for the production of sized papers optionally contain a higher proportion of, preferably, from 100 to 250 milliequivalents of hydrophobic radicals per 100 g of polyisocyanate mixture (I) and may also have an NCO functionality of less than 2.

Polyisocyanate mixtures (I) which contain tertiary amino and/or ammonium groups and only a very small proportion of, preferably, <10% by weight of polyether groups and few or no hydrophobic groups based on component G) are preferably suitable both as wet-strength, dry-strength and sizing agents.

For carrying out the process according to the invention for providing a dry- and wet-strength finish, the water-dispersible polyisocyanate mixtures are employed, for example, in the pulp, that is to say they are added directly to the cellulose-containing dispersion of the fibre raw materials. A procedure is followed here in which the polyisocyanate mixture is emulsified at a temperature of 20° to 80° C. in water and the resulting emulsion is added to a suspension of the fibre raw material or is dispersed directly in the suspension of the fibre substances and the paper is formed from this suspension by dewatering, and is subsequently dried. It is expedient to take 1 to 4 times the amount of water for emulsification of the polyisocyanate mixture. Larger quantities of water are also possible.

When employed on the surface, a finished basepaper is treated with an emulsion of the polyisocyanate mixture to be employed according to the invention in water and is then dried. Use in a size press is possible. In this case, the polyisocyanate mixture emulsified, as already described, in water is transferred to the finished web of paper. The dry- and wet-strength effect is already achieved immediately after drying. The wet-strength effect which can be achieved by surface treatment considerably exceeds the level which can be achieved with the wet-strength agents known to date with the same dosage of active substance.

To achieve the desired effect, it is particularly preferable to meter the aqueous emulsion of the polyisocyanate mixtures to be employed according to the invention into the fibre substances in the course of 60 minutes, preferably in the course of 15 minutes. In order to achieve the optimum wet-strength effect under conditions in practice, it is particularly advisable to meter in the polyisocyanate, for example, shortly before the headbox on the paper machinery. Sheets of paper having a weight per unit area of 50 to 100 m²/g will in general be formed in the laboratory for testing.

In water, the NCO groups of the polyisocyanate mixtures to be employed according to the invention hydrolyse slowly, with evolution of $CO_2$, to give the corresponding amines, which react with some of the NCO groups still present to give urea groups. Advantageously, however, no precipitates occur.

In the process according to the invention, the products can be metered into the fibre substance in the pulp in the pH range between 4 and 10, preferably between 5.5 and 9. Use in the neutral pH range (pH 6 to 7.5) is particularly preferred.

In this pH range, some of the tertiary amino groups are present in protonated form. It is also possible to carry out the dispersion with addition of acid. A cationic charge is obtained, regardless of the pH, if the polyisocyanates obtained by quaternisation of the tertiary amino groups are employed. However, quaternisation is not necessary for most uses.

The use amounts of polyisocyanate mixture (I) to be employed according to the invention depend on the effect sought. As a rule, use amounts of 0.001 to 50% by weight, preferably 0.1 to 10% by weight, particularly preferably 0.1 to 2.0% by weight of active compound, based on the .dry fibre raw material, are adequate. Metering in of the active substance, based on the fibre raw material, corresponds to that of the known wet-strength agents of the polyamidoamine/epichlorohydrin type. The polyisocyanate mixtures to be employed according to the invention result in ready-to-use papers having a good wet strength immediately from the machine. The wet-strength action can be intensified by storage of the finished paper and/or after-condensation. Generally, however, a higher level of wet strength can already be achieved from the machine than with conventional wet-strength agents. The dry strength is also improved compared with conventional wet-strength agents.

The process according to the invention is carried out under the processing temperatures customary in the paper industry. The processing time here depends on the temperature. The processing time is relatively long in the temperature range from 20° to 25° C. After storage of the aqueous emulsion for 6 hours, the wet-strength action still achieves about 70% of the value obtained if the emulsion is used immediately. At a higher temperature, for example at 50° C., processing within 6 hours is to be recommended. On the other hand, the maximum wet-strength action surprisingly depends hardly at all on the contact time with the cellulose. Papers which have been formed immediately and after a contact time of 2 hours after addition of the water-dispersible polyisocyanate mixture to the paper fibre substance in each case show the same wet strength level.

The strength level of the paper can be adjusted in the desired manner by suitable choice of the starting components. The process according to the invention is suitable not only for the preparation of papers having dry strength and strength in water, but also for the preparation of oil- and petrol-resistant papers.

The water-dispersible polyisocyanate mixtures (I) to be employed according to the invention can be employed in combination with other cationic auxiliaries, such as retention agents, fixing auxiliaries, dry-strength agents and wet-strength agents. In particular, fixing of fillers can be intensified further by addition of commercially available retention agents of the type of cationic polycondensates and polymers, for example polyamines, polyethylenimines, polyamidoamines and polyacrylamides, and the dual systems comprising cationic or cationic and anionic and optionally particulate components, such as silica sols and the like, This is of particular interest if use in the laminated paper sector is intended. Preferred retention agents in the context of the invention are cationic polycondensates of polyamines, preferably N-methyl-bis(3-aminopropyl)amine, and alkylene dihalides, preferably dichloroethane. However, it should be emphasised that the desired wet-strength effect can also be achieved without addition of special fixing agents. In particular, the strength of the paper can be increased by combination with polysaccharides, such as hydroxyethylcellulose, carboxymethylcellulose, starch, galactomannans or cationic derivatives thereof.

If appropriate, the polyisocyanate mixtures to be employed according to the invention can of course be employed together, that is to say simultaneously or successively, with the abovementioned cationic auxiliaries. However, since many of the auxiliaries contain organically bonded halogen, combination with AOX-free and/or AOX-low auxiliaries is particularly preferred, since chlorine-free papermaking is the chief aim.

The polyisocyanate mixtures (I) to be employed according to the invention are readily compatible with customary optical brighteners. The products to be employed according to the invention do not lead to a lowering in the whiteness, and do not influence the absorbency of the paper. Furthermore, a soft handle to the paper can be produced for use in the hygiene paper sector.

The polycondensates furthermore cause intensification of the sizing action of pulp sizing agents, such as reactive sizing agents, for example alkyl ketene dimers, alkenylsuccinic anhydride or dehydroabietyl isocyanate.

The process according to the invention leads to no AOX pollution of papermaking waste-waters. By the use according to the invention of the water-dispersible polyisocyanate mixtures, the COD values (COD=chemical oxygen demand) in the screen water of the paper machinery is considerably lower than in the case of nonionic products.

In comparison With processes which employ AOX-low products, the wet-strength requirements are met with considerably lower concentrations of ionic groups, at a corresponding NCO functionality, in the process according to the invention. The retention of fillers is likewise improved.

In contrast to polyamidoamine/epichlorohydrin wet-strength agents, the maximum wet strength which is also achieved when the agents are employed in the pulp can also be achieved when the agents are employed on the surface.

Another advantage of the process according to the invention is that the wet strength is achieved directly from the paper machinery. In contrast to the prior art, after-maturing of the paper or after-condensation—as is customary, for example, with polyamidoamine/epichlorohydrin resins—is not necessary.

In order to carry out the process according to the invention for the production of sized papers, the water-dispersible polyisocyanate mixtures (I) are employed, for example, in bulk or in the surface. The application form thus corresponds to the procedure described under wet-strength and dry-strength finishing. Good immediate sizing directly after sheet formation is obtained and can be further increased by post-condensation; in particular, the sizing action can readily be stepped via the metering In the following examples, the percentage data relate to percentages by weight, unless stated otherwise.

Preparation of the Raw Materials

Polyisocyanate (1)

87 g of a polyisocyanate which is prepared by trimerisation of some of the isocyanate groups of 1,6-diisocyanatohexane, contains isocyanurate groups, essentially comprises tris(6-isocyanatohexyl) isocyanurate and higher homologues thereof and has an NCO content of 21.4%, a content of monomeric 1,6-diisocyanatohexane of <0.3% and a viscosity of 3 000 mPas (23° C.) (NCO functionality about 4.0) are reacted with 13 g of a polyether which has been started from 2-(2-methoxyethoxy)ethanol, is based on ethylene oxide and has a number-average molecular weight of 350 g/mol and a hydroxyl number of 160 mg of KOH/g.

| NCO content: | 17.20% |
|---|---|
| Viscosity (23° C.): | 3 200 mPas |
| NCO functionality: | about 3.5. |

Polyisocyanate(2)

150 g of a polyisocyanate which is prepared by trimerisation of some of the isocyanate groups of 1,6-diisocyanatohexane, contains isocyanurate groups, essentially comprises tris(6-isocyanatohexyl) isocyanurate and higher homologues thereof and has an NCO content of 21.4%, a content of monomeric 1,6-diisocyanatohexane of <0.3% and a viscosity of 3 000 mPas (23° C.) (NCO functionality about 4) is reacted with 35.4 g of an α,ω-dihydroxypoly(oxyethylene) which has a number-average molecular weight of 400 g/mol and a hydroxyl number of 280 mg of KOH/g.

| NCO content: | 13.3% |
|---|---|
| NCO functionality: | about 3.0. |

Polyisocyanate (3)

201.9 g of a mixture off-dimeric and trimeric 1,6-diisocyanatohexane, which essentially comprises a mixture of bis(6-isocyanatohexyl)-uretdione and tris(6-isocyanatohexyl) isocyanurate (viscosity (23° C.): 150 mPas, NCO content: 21.6%, NCO functionality: about 2.3 to 2.5) are reacted with 17.7 g of an α,ω-dihydroxypoly(oxyethylene) having a number-average molecular weight of 400 g/mol and a hydroxyl number of 280 mg of KOH/g.

| NCO content: | 16.6% |
|---|---|
| NCO functionality: | about 2.3. |

Polyisocyanate (4)

90 g of a mixture of dimeric and trimeric 1,6-diisocyanatohexane, which essentially comprises a mixture of bis(6-isocyanatohexyl)-uretdione and tris(6-isocyanatohexyl) isocyanurate (viscosity (23° C.): 150 mPas, NCO content: 21.6%, NCO functionality: about 2.3 to 2.5) is reacted with 10 g of the polyether employed for the preparation of polyisocyanate (1).

| NCO content: | 18.6% |
|---|---|
| Viscosity (23° C.): | 540 mPas |
| NCO functionality: | about 2.2. |

Polyisocyanate (5)

85 g of a polyisocyanate essentially comprising tris(6-isocyanatohexyl) isocyanurate and having an NCO content of 22.5% and a viscosity of 800 mPas is reacted with 15 g of the polyether employed for the preparation of polyisocyanate (1).

| NCO content: | 16.9% |
|---|---|
| Viscosity (23° C.): | 1 560 mPas |
| NCO functionality: | about 3.2. |

Polyisocyanate (6)

87 g of a mixed dimer of 80% of 1,6-diisocyanatohexane and 20% of 1-isocyanato-3,3,5-trimethyl-5-isocyanatomethylcyclohexane are reacted with 13 g of the polyether employed for the preparation of polyisocyanate (1).

| NCO content: | 15.6% |
|---|---|
| Viscosity (23° C.): | 950 mPas |
| NCO functionality: | about 2.2. |

Polyisocyanate.(7)

87 g of a mixed dimer of 65% of 1,6-diisocyanatohexane and 35% of 1-isocyanato-3,3,5-trimethyl-5-isocyanatomethyl-cyclohexane are reacted with 13 g of the polyether employed for the preparation of polyisocyanate (1).

| NCO content: | 14.4% |
|---|---|
| Viscosity (23° C.): | 5 900 mPas |
| NCO functionality: | about 2.2. |

Polyisocyanate (8)

83 g of a polyisocyanate which is prepared by trimerisation of some of the isocyanate groups of 1,6-diisocyanatohexane, contains isocyanurate groups, essentially comprises tris(6-isocyanatohexyl) isocyanurate and higher homologues thereof and has an NCO content of 21.4%, a content of monomeric 1,6-diisocyanatohexane of <0.3% and a viscosity of 3 000 mPas (23° C.) (NCO functionality about 4.0) are reacted with 17 g of a polyether which has been started from 2-(2-methoxyethoxy)ethanol, is based on ethylene oxide and has a number-average molecular weight of 350 g/mol and a hydroxyl number of 160 mg of KOH/g.

| NCO content: | 14.9% |
|---|---|
| Viscosity (23° C.): | 5 800 mPas |
| NCO functionality: | about 3.2. |

Polyisocyanate (9)

90 g of a polyisocyanate which is prepared by trimerisation of some of the isocyanate groups of 1,6-diisocyanatohexane contains isocyanurate groups, essentially comprises tris(6-isocyanatohexyl) isocyanurate and higher homologues thereof and has an NCO content of 21.4%, a content of monomeric 1,6-diisocyanatohexane of <0.3% and a viscosity of 3 000 mPas (23° C.) (NCO functionality about 4.0) are reacted with 10 g of a polyether which has been started from trimethylolpropane, is based on ethylene oxide/propylene oxide in a weight ratio of 85/25 and has a number-average molecular weight of about 1 180 g/mol, a hydroxyl number of 95±7 mg of KOH/g and an average OH functionality of 2 (viscosity (25° C.)=250 mPas).

| NCO content: | 18.2% |
|---|---|
| Viscosity (23° C.): | 7 524 mPas |
| NCO functionality: | about 3.7. |

Polyisocyanate (10)

The polyisocyanate is identical to the trimer of 1,6-diisocyanatohexane employed for the preparation of polyisocyanate (1).

Preparation of the Water-Dispersible Polyisocyanate mixtures

Example 1

12 g of 1,2-bis(dimethylamino)-2-hydroxypropane (0.082 equivalent of OH) are added dropwise to 100 g of polyisocyanate (1) (0,41 equivalent of NCO) at 30° C. in the course of 30 minutes, while stirring, 0.5% by. weight of dibutyltin (II) dilaurate were added to the polyisocyanate at the start of the reaction. The mixture is heated to 40° C. and kept at this temperature for 12 hours. After cooling, a clear, colourless oil which can be dispersed in water by gentle stirring with a spatula is obtained. The product has the following properties:

| NCO content: | 11.6% |
|---|---|
| Viscosity (23° C.): | about 70 000 mPas |
| NCO functionality: | about 2.8. |

Examples 2 to 24

Examples 2 to 24 were carried out in accordance with Example 1, The experimental conditions are summarised in the following Table 1.

Definition of the abbreviations:

| BDMAHP = | 1,3-bis(dimethylamino)-2-hydroxypropane |
|---|---|
| DMAEHE = | 1-(2-dimethylamino-ethoxy)-2-hydroxyethane |
| DBAHE = | dibutylamino-hydroxyethane |
| DEAHE = | diethylamino-hydroxyethane (= diethylamino-ethanol) |
| MDEA = | N-methyl-diethanolamine |
| TEA6EO = | triethanolamine + 6 mol EO |
| PEO350 = | polyethylene glycol monomethyl ether (M = 350 g/mol) |
| TMAHP = | 1-trimethylammonium 3-hydroxypropane-methylsulphate |
| Ads400 = | polyester-ether-diol from 1.05 mol of polyethylene glycol 400 and 1.00 mol of adipic acid |
| DMAAP = | 1-dimethylamino-3-amino-propane |

TABLE 1

| Example No. | Amine type (I) | Isocyanate type | Active H[1]: NCO [equivalents/equivalents] | Solvent | Wt. of isocyanate [g] | NCO employed [equivalents] | Wt. of amine (I) [g] | Active H[1] amine [equivalents] |
|---|---|---|---|---|---|---|---|---|
| 1 | BDMAHP | (1) | 0.200 | none | 100 | 0.410 | 12.0 | 0.082 |
| 2 | BDMAHP | (1) | 0.100 | none | 100 | 0.410 | 6.0 | 0.041 |
| 3 | BDMAHP | (1) | 0.400 | none | 81.8 | 0.335 | 19.6 | 0.134 |
| 4 | DBAHE | (1) | 0.200 | none | 150 | 0.614 | 21.3 | 0.123 |
| 5 | DEAHE | (1) | 0.200 | none | 300 | 1.229 | 28.8 | 0.246 |
| 6 | DMAEHE | (1) | 0.200 | none | 150 | 0.614 | 16.4 | 0.123 |
| 7 | MDEA | (1) | 0.200 | none | 150 | 0.614 | 7.3 | 0.123 |
| 8 | DEAHE | (2) | 0.065 | acetone | 185.3 | 0.587 | 4.4 | 0.038 |
| 9 | DBAHE | (3) | 0.143 | none | 219.6 | 0.859 | 21.3 | 0.123 |
| 10 | DBAHE | (4) | 0.200 | none | 100 | 0.443 | 15.2 | 0.088 |
| 11 | DBAHE | (5) | 0.200 | none | 100 | 0.402 | 13.8 | 0.080 |
| 12 | DEAHE | (1) | 0.043 | none | 98 | 0.401 | 2.0 | 0.017 |
| 13 | DMAAP | (1) | 0.200 | acetone | 100 | 0.410 | 8.36 | 0.082 |
| 14 | DEAHE | (1) | 0.110 | none | 95 | 0.389 | 5.0 | 0.043 |
| 15 | TEA6EO | (1) | 0.100 | acetone | 100 | 0.410 | 5.6 | 0.041 |
| 16 | DEAHE | (8) | 0.024 | none | 99 | 0.355 | 1.0 | 0.0086 |
| 17 | BDMAHP | (8) | 0.024 | none | 99 | 0.355 | 1.25 | 0.0086 |
| 18 | DEAHE | (1) | 0.054 | none | 89 | 0.364 | 1.00 | 0.0086 |
| 19 | DEAHE | (9) | 0.020 | none | 99 | 0.429 | 1.00 | 0.0086 |
| 20 | TMAHP | (1) | 0.05 | none | 97.6 | 0.400 | 4.6 | 0.020 |
| 21 | DEAHE | (6) | 0.021 | none | 109.3 | 0.406 | 1.00 | 0.0085 |
| 22 | DEAHE | (7) | 0.021 | none | 118.4 | 0.406 | 1.00 | 0.0085 |
| 23 | DEAHE | (10) | 0.103 | none | 86.13 | 0.439 | 1.00 | 0.0085 |
| 24 | DEAHE | (1) | 0.021 | none | 99 | 0.406 | 1.00 | 0.0085 |

| Example No. | Polyether type | Weight of polyether [g] | Active B[1] polyether [equivalents] | NCO after reaction experimental [%] | NCO functionality calculated | EO-content [%] | Content of tertiary N [m equivalents/100 g] |
|---|---|---|---|---|---|---|---|
| 1 | — | — | — | 11.6 | 2.8 | 11.6 | 146.8 |
| 2 | — | — | — | 2) | 3.1 | 12.3 | 77.5 |
| 3 | — | — | — | 2) | 2.1 | 10.5 | 265.1 |
| 4 | — | — | — | 11.7 | 2.8 | 11.4 | 71.8 |
| 5 | — | — | — | 12.6 | 2.8 | 11.9 | 74.8 |
| 6 | — | — | — | 12.1 | 2.8 | 11.7 | 73.9 |
| 7 | — | — | — | 13.0 | 2.8 | 12.4 | 39.1 |
| 8 | — | — | — | 8.3 (12.2)* | 2.8 | 18.7 | 20.0 |
| 9 | — | — | — | 15.0 | 2.0 | 7.3 | 51.1 |
| 10 | — | — | — | 12.5 | 1.8 | 8.7 | 76.4 |
| 11 | — | — | — | 13.2 | 2.6 | 13.2 | 70.3 |
| 12 | — | — | — | 17.1 | 3.4 | 12.7 | 17.1 |
| 13 | — | — | — | 6.8 | 2.8 | 12.0 | 75.7 |
| 14 | — | — | — | 11.8 | 3.1 | 12.4 | 42.7 |
| 15 | — | — | — | 9.1 (14.3)* | 3.1 | 12.3 | 12.9 |
| 16 | — | — | — | 14.4 | 3.1 | 16.8 | 8.6 |
| 17 | — | — | — | 13.9 | 3.1 | 16.8 | 8.5 |
| 18 | Ads400 | 10.0 | 0.011 | 14.0 | 3.2 | 18.07 | 8.6 |
| 19 | — | — | — | 17.6 | 3.6 | 9.90 | 8.6 |
| 20 | — | — | — | 15.7 | 3.3 |  | 19.6 |
| 21 | — | — | — | 13.5 | 2.1 | 12.88 | 7.7 |
| 22 | — | — | — | 12.8 | 2.1 | 12.90 | 7.1 |
| 23 | PEO350 | 12.87 | 0.0368 | 16.0 | 3.5 | 12.87 | 8.5 |
| 24 | — | — | — | 17.0 | 3.5 | 12.87 | 8.5 |

*value in parentheses calculated for 100% active substance
[1] active H relates to the groups which are reactive towards isocyanate and are present in the amine or polyether
[2] not determined

Use Examples

Use Example I

A mixture of 80% of bleached pine sulphate pulp and 20% of bleached birch sulphate pulp is beaten at a consistency of 2.5% in a Holläander to a Schopper-Riegler freeness of 38°. 100 g of this pulp are introduced into a glass beaker and diluted to 1 000 ml with water.

0.3% by weight, 0.6% by weight and 0.9% by weight of active substance, based on the fibre substance, from the products prepared according to the examples are added to the pulp suspension, after prior dispersion in water (emulsions containing 20% by weight of polyisocyanate).

After a stirring time of 3 minutes, sheets of paper having a weight per unit area of about 80 m²/g are formed on a sheet-forming machine (Rapid-Köthen unit) with the contents of the glass beaker. The sheets of paper are dried at 85° C. under a vacuum of 20 mm Hg for 8 minutes and after-heated at 110° C. in a drying cabinet for a further 10 minutes.

After the conditioning, 5 test strips 1.5 cm wide are cut out of each sheet of paper and immersed in distilled water for 5 minutes. Thereafter, the wet strips are immediately tested for their wet breaking load in a tensile tester. The test results are summarised in Table 2.

TABLE 2

Wet breaking loads when used in the pulp, after condensation at 110° C. (10 minutes)

| Use Example No. | Isocyanate according to example | Solids content [%] | Viscosity [mPas] | Wet breaking load [N] at an amount of active substance used of | | |
|---|---|---|---|---|---|---|
| | | | | 0.3% | 0.6% | 0.9% |
| I-1 | 1 | 100 | highly viscous | 9.6 | 16.0 | 18.9 |
| I-2 | 2 | 100 | 38000 | 3.4 | 5.7 | 7.6 |
| I-3 | 3 | 100 | highly viscous | 1.7 | 2.9 | 3.9 |
| I-4 | 4 | 100 | 7450 | 11.7 | 15.6 | 17.9 |
| I-5 | 5 | 100 | 7450 | 5.8 | 9.1 | 10.8 |
| I-6 | 6 | 100 | 11760 | 6.9 | 10.0 | 13.4 |
| I-7 | 7 | 100 | 40760 | 13.1 | 15.4 | 17.8 |
| I-8 | 12 | 100 | 3010 | 15.9 | 23.1 | 25.9 |
| I-9 | 14 | 100 | 6130 | 11.7 | 18.4 | 24.3 |
| I-10 | 19 | 100 | 8850 | 4.5 | 7.0 | 8.9 |
| I-11 | 20 | 100 | 11230 | 8.0 | 19.4 | 23.5 |
| I-12 | 23 | 100 | 4280 | 11.5 | 14.3 | 17.7 |

Use Example II

Papers having a weight per unit area of 80 g/m² were produced from 80% of softwood pulp and 20% of hardwood pulp with an SR freeness of 35° at pH 7 without a wet-strength agent. The papers were finished on a laboratory size press from Mathis, Zurich, Switzerland, type HF. A solution or emulsion which contained 0.3%, 0.75% and 1.2% of the water-dispersible polyisocyanates was employed as the liquor.

The wet uptake of the paper was 100%. The papers were dried at 85° C. for 8 minutes. Some of the papers were additionally subjected to condensation at 110° C. for 10 minutes; for comparison, a known polyamidoamine resin and the nonionic polyisocyanate (1) were also tested. The wet breaking load was measured on the sheets of paper analogously to Use Example I.

The results show, surprisingly, that the paper obtained by the process according to the invention already results in a considerably higher wet strength in the non-condensed form than when the commercially available polyamidoamine resin is used, and with after-condensation is far superior to the polyamidoamine resin.

The example moreover shows the positive effect of the polyisocyanate to be employed according to the invention compared with the nonionic polyisocyanate (1).

TABLE 3

Use on the surface (size press)

| Ex. No. | Product | Wet breaking load [N] non-condensed at an amount of active compound in the paper of | | | Wet breaking load [N] condensed at an amount of active compound in the paper of | | |
|---|---|---|---|---|---|---|---|
| | | 0.3% | 0.75% | 1.2% | 0.3% | 0.75% | 1.2% |
| II-1 | polyamidoamine resin (according to Ex. 3a of U.S. Patent Specification 48 57 586) | 2.9 | 5.7 | 4.2 | 7.8 | 11.1 | 13.0 |
| II-2 | polyisocyanate (1) | 5.3 | 5.8 | 7.4 | 14.0 | 15.7 | 21.7 |
| II-3 | according to Example 12 | 8.2 | 10.9 | 13.6 | 15.8 | 20.0 | 24.0 |
| II-4 | according to Example 24 | 7.0 | 10.8 | 12.8 | 13.5 | 19.9 | 22.5 |

Use Example III

Analogously to Use Example I, sheets of paper were first produced using the wet-strength agent in the pulp. The papers were dried at 85° C. for 8 minutes. Some of the papers were additionally subjected to condensation at 110° C. for 10 minutes. A known polyamide resin and the nonionic polyisocyanate (1) were also tested for comparison. The wet breaking load was measured on the sheets of paper analogously to Use Example I.

The results show, surprisingly, that the paper obtained by the process according to the invention already has a considerably higher wet strength, even in the non-condensed state, than the paper obtained using the known polyamidoamine resin and the nonionic polyisocyanate (1). With post-condensation, the values of the polyamidoamine resin are reached. The polyisocyanates according to the invention moreover also result in considerably higher wet strength values with after-condensation compared with the nonionic polyisocyanate (1).

TABLE 4

Use in the pulp

| Ex. No. | Product | Wet breaking load [N] non-condensed at an amount of active compound in the paper of | | | Wet breaking load [N] condensed at an amount of active compound in the paper of | | |
|---|---|---|---|---|---|---|---|
| | | 0.3% | 0.75% | 1.2% | 0.3% | 0.75% | 1.2% |
| III-1 | polyamidoamine resin (according to Ex. 3a of U.S. Patent Specification 48 57 586) | 4.0 | 8.4 | 10.1 | 9.5 | 14.9 | 17.5 |
| III-2 | polyisocyanate (1) | 2.6 | 4.2 | 4.7 | 4.0 | 6.5 | 7.3 |
| III-3 | according to Example 12 | 4.6 | 9.9 | 12.3 | 6.6 | 12.8 | 15.8 |
| III-4 | according to | 6.6 | 10.0 | 12.6 | 9.5 | 13.9 | 18.7 |

TABLE 4-continued

| | | Use in the pulp | | | | | |
|---|---|---|---|---|---|---|---|
| | | Wet breaking load [N] non-condensed at an amount of active compound in the paper of | | | Wet breaking load [N] condensed at an amount of active compound in the paper of | | |
| Ex. No. | Product | 0.3% | 0.75% | 1.2% | 0.3% | 0.75% | 1.2% |
| | Example 24 | | | | | | |

Use Example IV

Analogously to Use Example I, sheets of paper were formed with amounts of active compound used of 0.45% and 0.9%, based on absolutely dry pulp. Compared with Use Example 1, however, the following changes were made:

a) The polyisocyanate emulsified in water (concentration 2%) was added to the pulp suspension only after a certain residence time, and the sheet of paper was then formed immediately.

b) In another series, the polyisocyanate was added to the pulp suspension immediately as an aqueous emulsion (concentration 2%), sheet formation taking place only after a certain contact time with the cellulose.

essentially comprises tris(6-isocyanatohexyl) isocyanurate and higher homologues thereof and has an NCO content of 21.9%, a monomeric 1,6-diisocyanatohexane content of <0.3% and a viscosity of 3000 mPas (23° C.) (NCO functionality about 4.0) is reacted with 5.75 parts of N,N-diethylaminoethanol (DEAHE). The mixture is stirred at 60° C. for 6 hours with exclusion of moisture.

| NCO content | 18.66% |
|---|---|
| Viscosity (23° C.): | 5310 mpas |

Examples 26 to 29

Examples 26 to 29 were carried out in accordance with Example 25. The experimental conditions for Examples 25 to 29 are shown in Table 6 below.

TABLE 5

Influence of the standing time in water and influence of the contact time with cellulose

| Ex. | Product | Wet breaking load [N] after a contact time with the pulp [minutes] [series b)] | | | | Wet breaking load [N] after a standing time in water [minutes] [series a)] | | | |
|---|---|---|---|---|---|---|---|---|---|
| | Amount used: 0.45% of active compound | 1 | 5 | 15 | 120 | 0 | 60 | 120 | 360 |
| IV-1 | polyamidoamine resin*) | 11.3 | 11.7 | 13.6 | 11.7 | 11.7 | 11.9 | 12.2 | 13.2 |
| IV-2 | polyisocyanate (1) | 3.7 | 5.4 | 6.6 | 5.4 | 5.4 | 5.3 | 5.5 | 4.7 |
| IV-3 | according to Ex. 24 | 11.1 | 10.7 | 11.2 | 10.7 | 10.7 | 11.8 | 11.8 | 7.1 |
| | Amount used: 0.9% of active compound | | | | | | | | |
| IV-4 | polyamidoamine resin*) | 15.0 | 16.5 | 16.2 | 16.5 | 16.5 | 17.4 | 17.9 | 16.6 |
| IV-5 | Polyisocyanate (1) | 5.3 | 7.0 | 9.5 | 7.0 | 7.0 | 7.6 | 6.9 | 6.8 |
| IV-6 | according to Ex. 24 | 13.1 | 13.8 | 12.5 | 13.8 | 13.8 | 14.8 | 15.5 | 8.5 |

*)according to Example 3a of U.S. Patent Specification 4 857 586

Example 25

94.25 parts of a polyisocyanate containing isocyanurate groups which has been prepared by trimerisation of some of the isocyanate groups by 1,6-diisocyanatohexane and which

TABLE 6

| Example No. | Solvent | Isoc. [g] | Isoc. [mol] | DEAHE [g] | DEAHE [mol] | NCO after react. exp. [%] | NCO content after react. calc. [%] |
|---|---|---|---|---|---|---|---|
| 25 | none | 94.25 | 0.4914 | 5.75 | 0.0491 | 18.7 | 18.6 |
| 26 | none | 89.13 | 0.4647 | 10.87 | 0.0929 | 15.5 | 15.6 |
| 27 | none | 84.53 | 0.4407 | 15.47 | 0.1332 | 13.9 | 13 |
| 28 | none | 96.95 | 0.5055 | 3.05 | 0.026 | 20.3 | 20.1 |
| 29 | acetone | 89.1 | 0.465 | 21.3 | 0.0929 | 6.5 | 14.1*/5.0 |

*Calculated for 100 % of active substance

Example 30

25 parts of the polyisocyanate from Example 26 are reacted with 2.9 parts of dimethyl sulphate in 25 parts of acetone. The mixture is stirred at room temperature for 18 hours.

| Content of the solution: | 47% |
|---|---|
| NCO content | 7.3% of solution |
| Viscosity (23° C.): | 12,330 mPas (100%) |

Example 31

85.0 parts of a polyisocyanate containing isocyanurate groups which has been prepared by trimerisation of some of the isocyanate groups by 1,6-diisocyanatohexane and which essentially comprises tris(6-isocyanatohexyl) isocyanurate and higher homologues thereof and has an NCO content of 21.9%, a monomeric 1,6-diisocyanatohexane content of <0.3% and a viscosity of 3000 mPas (23° C.) (NCO functionality about 4.0) are reacted with 15.0 parts of N,N-diethylaminoethanol and 10 parts of N-methylstearyl-amine. The mixture is stirred at 60° C. for 6 hours with exclusion of moisture.

| NCO content | 11.0% (calc.: 10.9%) |
|---|---|
| Viscosity (23° C.): | 22,380 mPas |

Polyisocyanate 32

100 parts of an ester group-containing polyisocyanate obtained in accordance with Example 2 of DE-A3 743 782 by reaction of tetrakis(trimethylsilyloxymethyl)methane with 5-isocyanatocaproyl chloride in a molar ratio of 1:4, having an NCO content of 23.7% and a viscosity of 252 mPas (23° C.) (NCO functionality 4.0) are reacted with 16.5 parts of N, N-dimethylaminoethanol. The isocyanate is then stirred at 60° C. for 6 hours with exclusion of moisture.

| NCO Content: | 14.6% |
|---|---|
| Viscosity (23° C.): | 1290 mPas |
| NCO functionality: | about 3.0 |

Polyisocyanate 33

100 parts of an ester group-containing polyisocyanate obtained in accordance with Example 2 of DE-A3 743 782 by reaction of tetrakis(trimethylsilyloxymethyl)methane with 5-isocyanatocaproyl chloride in a molar ratio of 1:4, having an NCO content of 23.7% and a viscosity of 252 mPas (23° C.) (NCO functionality 4.0) are reacted with 33.0 parts of N, N-dimethylaminoethanol. The isocyanate is then stirred at 60° C. for 6 hours with exclusion of moisture.

| NCO Content: | 8.4% |
|---|---|
| Viscosity (23° C.): | 4180 mPas |
| NCO functionality: | about 2.0 |

Polyisocyanate 34

78 parts of the polyisocyanate from Example 33 are reacted with 11.8 parts of dimethyl sulphate in 89.8 parts of 1,2-diacetoxypropane. The mixture is stirred at room temperature for 18 hours.

| Content of the solution: | 50% |
|---|---|
| NCO content: | 3.65% (solution) |
| NCO functionality: | about 2.0 |

Use Example V: Use as Wet-Strength Agent for Paper

A mixture of 80% of bleached pine sulphate pulp and 20% of bleached birch sulphate pulp is beaten at a consistency of 2.5% in a Holländer to a Schopper-Riegler freeness of 38°. 100 g of this pulp are introduced into a glass beaker and diluted to 1000 ml with water.

The prespecified amount of polyisocyanates (active substance, based on fibre substance) are added to the pulp suspension, after prior dispersion in water or in weakly acidic solution (pH 4) (emulsions containing 10% by weight of polyisocyanate).

After a stirring time of 3 minutes, sheets of paper having a weight per unit area of about 80 $m^2/g$ are formed on a sheet-forming machine (Rapid-Köthen unit) with the contents of the glass beakers. The sheets of paper are dried at 85° C. under a vacuum of 20 mm Hg for 8 minutes and after-heated at 110° C. in a drying cabinet for a further 10 minutes.

After the conditioning, 5 test strips 1.5 cm wide are cut out of each sheet of paper and immersed in distilled water for 5 minutes. Thereafter, the wet strips are immediately tested for their wet breaking load in a tensile tester.

The test results are summarised in Table 7.

TABLE 7a

Wet breaking loads when used in the pulp, after condensation at 110° C. (10 minutes)

| Example No. | Solids content [%] | Viscosity [mPas] | Wet breaking load [N] at an amount of active substance used of | | |
|---|---|---|---|---|---|
| | | | 0.3% | 0.6% | 0.9% |
| 25 | 100 | 5310 | 8.6 | 23.1 | 15.7 |
| 26 | 200 | 11800 | 9.9 | 15.3 | 18.2 |
| 27 | 100 | 14530 | 8.4 | 13.6 | 15.9 |
| 28 | 100 | 4570 | 5.2 | 7.9 | 9.2 |
| 29 | 35.3 | not det. | 13.6 | 19.6 | 22.7 |
| 30 | 100 | 12330 | 12.8 | 22.1 | 22.6 |
| 31 | 100 | 22380 | 9.3 | 14.0 | 17.1 |

TABLE 7b

Wet breaking loads when used in the pulp, after condensation at 110° C. (10 minutes)

| Example No. | Solids content [%] | Viscosity [mPas] | Wet breaking load [N] at an amount of active substance used of | | |
|---|---|---|---|---|---|
| | | | 0.4% | 0.8% | 1.2% |
| 32 | 100 | 1290 | 14.5 | 22.7 | 24.0 |
| 33 | 100 | 4180 | 8.1 | 7.7 | 8.4 |
| 34 | 50 | not det. | 4.5 | 6.7 | 10.1 |

Use Example VI: Use as a Pulp Sizing Agent for Paper

The prespecified amount of the active compound polyisocyanate is added with stirring to a 0.35% aqueous mixture of 50 parts of bleached softwood pulp and 50 parts of bleached hardwood pulp containing 25% of calcium carbonate, based on fibre substance. The polyisocyanate is emulsified in water in advance in the manner described above. The substance system has a pH of from 7 to 7.5.

After a short residence time (from 10 to 20 seconds), a sheet of paper is formed on a laboratory sheet former. This sheet is-pressed out between felts and then dried for 10 minutes at 90° C. in a drying cylinder. Sheets of paper having a weight per unit area of 80 g/m$^2$ are obtained.

The action is tested by means of the Cobb test: in accordance with DIN 53132, the water absorption of a paper on one side in a test time of 60 seconds is used to assess the sizing action.

The test results are shown in Table 8.

TABLE 8

| Polyisocyanate of Example | Use in pulp sizing | | | | | | |
|---|---|---|---|---|---|---|---|
| | Cobb$_{60}$ value of the sample for an active compound use in an amount of | | | | | | |
| | 0.3% | 0.5% | 0.6% | 0.9% | 1.0% | 1.2% | 2.0% |
| 26 | >80 | | 78.4 | 23.4 | | 24.4 | |
| 29 | >80 | | 30.4 | 21.8 | | 20.8 | |
| 30 | >80 | | >80 | 37.0 | | 27.8 | |
| 31 | | >100 | | | 36 | | 21.4 |
| 32 | | | 46 | | | | |
| 33 | | | 24.5 | | | | |

What is claimed is:

1. A process for the preparation of cellulosefiber-containing paper or paperboard provided with a dry-strength and wet-strength finish and/or sized, in which the cellulose-containing material is treated with a water-dispersible polyisocyanate mixture with α) a content of isocyanate groups of 10 to 700 milliequivalents per 100 g of mixture, β) a mean NCO functionality of ≧1.0, γ) a content of ethylene oxide units of from 0 to 30% by weight, based on the mixture, with the polyethylene oxide chains having a mean molecular weight (number average) of from 100 to 3500, δ) a content of tertiary amino groups or ammonium groups of from 50 to 5000 milliequivalents per 100 g of mixture, and ε) a content of hydrophobic radicals of 0–250 milliequivalents per 100 g of mixture.

2. The process according to claim 1, in which water-dispersible polyisocyanate mixtures (I) are employed with α) a content of isocyanate groups of 10 to 300 milliequivalents per 100 g of mixture, β) an average NCO functionality of 1.0 to 5, γ) a content of ethylene oxide units of 0 to 20% by weight, based on the mixture, wherein the polyethylene oxide chain has an average molecular weight (number average) of 100 to 3500, δ) a content of tertiary amino groups or ammonium groups of 50 to 3500 milliequivalents per 100 g of mixture, and ε) a content of hydrophobic radicals of 0–100 milliequivalents per 100 g of mixture.

3. The process according to claim 1, in which water-dispersible polyisocyanate mixtures (I) with α) a content of isocyanate groups of 47 to 595 milliequivalents, based on 100 g of mixture, β) an average NCO functionality of 1.5 to 4.2, γ) a content of ethylene oxide units of 7 to 30% by weight, based on the mixture, wherein the polyethylene oxide chain has an average molecular weight (number average) of 100 to 3500, and δ) a content of tertiary amino groups or ammonium groups of 1 to 500 milliequivalents per 100 g of mixture, are employed.

4. The process according to claim 1, in which water-dispersible polyisocyanate mixtures with α) a content of isocyanate groups of 238 to 476 milliequivalents, based on 100 g of mixture, β) an average NCO functionality of 2.0 to 4.2, γ) a content of ethylene oxide units of 7 to 20% by weight, based on the mixture, wherein the polyethylene oxide chain has an average molecular weight (number average) of 100 to 600 g/mol, and δ) a content of tertiary amino groups or ammonium groups of 5 to 300 milliequivalents per 100 g of mixture, are employed.

* * * * *

UNITED STATES PATENT AND TRADEMARK OFFICE
CERTIFICATE OF CORRECTION

PATENT NO. : 5,503,714
DATED : April 2, 1996
INVENTOR(S) : Reiners, et al.

It is certified that error appears in the above-indentified patent and that said Letters Patent is hereby corrected as shown below:

Col. 4, line 22   Delete " $<1.0$ " and substitute -- $\geq 1.0$ --
Col. 4, line 28   Delete " $\beta$ " and substitute -- $\delta$ --
Col. 20, line 35  Delete " off " and substitute -- of --

Signed and Sealed this

Fifteenth Day of October, 1996

Attest:

BRUCE LEHMAN

*Attesting Officer*    *Commissioner of Patents and Trademarks*